United States Patent [19]

Yamashita et al.

[11] 4,434,671
[45] Mar. 6, 1984

[54] TENSION SENSOR

[75] Inventors: Ichiro Yamashita, Yawata; Yukihiko Ise, Toyonaka, both of Japan

[73] Assignee: Matsushita Electric Industrial Co., Ltd., Osaka, Japan

[21] Appl. No.: 293,982

[22] Filed: Aug. 18, 1981

[30] Foreign Application Priority Data

Aug. 18, 1980 [JP] Japan .................................. 55-113899

[51] Int. Cl.³ .............................................. G01L 5/10
[52] U.S. Cl. .............................. 73/862.48; 73/DIG. 2; 73/862.69
[58] Field of Search ...................... 73/862.39, 722, 728, 73/862.45, 862.47, 779, 862.69, 862.48, DIG. 2; 324/209; 336/20

[56] References Cited

PUBLICATIONS

*IEEE Transactions on Magnetics*, vol. MAG-15, No. 6, (Nov. 1979), "Sensitive Force Transducers Using a Single Amorphous Core Multivibrator Bridge", pp. 1806–1808.

*IEEE Transactions on Magnetics*, vol. MAG-16, No. 2, (Mar. 1980), "Measurement of Saturation Magnetostriction of a Thin Amorphous Ribbon by Means of Small-Angle Magnetization Rotation", Narita et al., pp. 435–439.

*IEEE Transactions on Magnetics*, vol. MAG-17, No. 6, (Nov. 1981), "An Improved Force Transducer Using Amorphous Ribbon Cores", pp. 3376–3378.

*Primary Examiner*—Gerald Goldberg
*Assistant Examiner*—Brian Tumm
*Attorney, Agent, or Firm*—Wenderoth, Lind & Ponack

[57] ABSTRACT

A tension sensor for sensing tension in the magnetic tape by measuring variations in an inductance value which arise as a result of applying stress which has been transformed from tension in the object to be measured to an amorphous magnetic alloy part of an inductance element. The magnetostrictive effect of the amorphous magnetic alloy which is both resilient and magnetostrictive is utilized in sensing the tension in the tape. The magnetic alloy is used for at least a part of a magnetic core of the inductance element.

4 Claims, 9 Drawing Figures

TENSION SENSOR

BACKGROUND OF THE INVENTION

This invention relates to a tension sensor and, in particular, to a tension sensor for measuring tension in a magnetic tape running along a predetermined path.

In recent years, many kinds of instruments, such as VTR's, audio tape decks, etc. employing a magnetic tape as a recording medium, have been widely used. In these instruments, a provision of a monitoring device to sense the tape tension is indispensable for the reproduction of a record of superior quality.

As a means of measuring the tape tension, those apparatus which are of a mechanical type or a force-displacement conversion type have so far generally been used, and particularly there has been employed a mechanism in which a tape guiding post is provided on one end of an arm which is rotatably supported by a bearing and biased in one direction by a resilient body such as a spring or the like and the tape tension is measured by sensing the rotational displacement of the arm which is caused by the tape tension which is in opposition to the biasing force of the spring or the like.

However, so far as depending on such a method as above, not only is the measurable range limited by the kind of resilient body used as a spring or the size of the turning arm but a detrimental effect due to a change of the measuring position with respect to the tape is also often caused because such a system uses a sensing displacement transformed from a force; in addition, such a system has a drawback in that it requires a wide space for displacement. Furthermore, since there are many cases requiring conversion of such a displacement into an electric signal, an increase in the number of constituent parts and cost occurs as well as making the precision in measurement questionable.

Other apparatus of the mechanical type have drawbacks of almost the same kind as above.

These tension sensors can rarely meet the requirements for miniaturization and performance improvements that are demanded today, and the development of a novel tension sensor is earnestly needed at the present stage.

An object of this invention is to solve such problems inherent in conventional tension sensors as described above and provides a novel tension sensor which is capable of accurately measuring tape tension in a wide range without inflicting any disturbance to the tape.

DETAILED DESCRIPTION OF THE PREFERRED EMBODIMENT

Recently, it has been made possible to mass-produce amorphous magnetic alloys at a low cost depending on the super high speed cooling method. Such amorphous alloys are characterized by the fact that:

(1) they are excellent soft magnetic materials and are capable of being made into materials having relative magnetic permeability ($\mu r$) amounting 10,000 or more;

(2) a large saturation density can be assumed;

(3) high anti-corrosion property is ensured by the addition of a small quantity of only Cr or the like;

(4) a strength equal to that of piano wire can be obtained as shown in Table 1 and a thin film strong enough even when made as thick as 20 um or so is also obtained;

TABLE 1

| Constituent | Tensile strength (kg/mm$^2$) |
| --- | --- |
| $Fe_{75}Si_{10}B_{12}$ | 340 |
| $Fe_{80}P_{13}C_7$ | 310 |
| $Fe_{72}Cr_8P_{13}C_7$ | 385 |

(5) a degree of dependency of magnetism upon temperature at the room temperature or thereabout is low; and, (a change at the rate of about 10% within the temperature range of $-10° \sim 50°$ C.

(6) a high magnetostrictive effect can be obtained from an Fe amorphous magnetic material.

This invention utilizes such a magnetostrictive effect of the amorphous magnetic alloy having the excellent characteristic as described above for the tension sensor.

Figure 1:
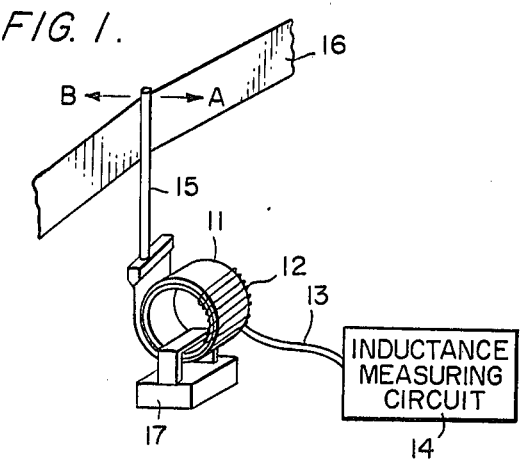
FIG. 1 is a perspective view of a tension sensor embodying this invention.

Referring to drawings, a detailed description of this invention will be made as follows:

FIG. 1 shows the 1st embodiment of this invention, in which the reference numeral 11 indicates a thin belt-like amorphous magnetic alloy having a magnetostrictive effect, wound in the form of spiral, and having the end thereof which is at the center of the spiral fixed to the retainer 17. As a result of such an arrangement, the amorphous magnetic alloy 11 is adapted to have the nature of a coiled spring in which its excellent springy resiliency is well utilized. The numeral 12 indicates a coil wound around the magnetic core of the amorphous magnetic alloy 1 so as not to hamper the motion of said alloy 11. The numeral 13 stands for a lead wire extended from the coil 12 and connected to the inductance measuring circuit 14. The numeral 15 represents a shaft to transmit tension in the magnetic tape 16 to the amorphous magnetic alloy 11.

When the retainer is positioned so that the tension transmitting shaft 15 is brought into contact with the tape 16 having a certain degree of tension therein, the tension transmitting shaft 15 tends to be displaced by thrust of the tape 16 in the direction shown by the arrow A in the drawing; however, another force tending to thrust said shaft in the direction shown by the arrow B also acts on account of the springy resiliency of the amorphous magnetic alloy 11. Eventually, the displacement of the tension transmitting shaft is stopped by the equilibrium between the two abovenoted forces. At this time, the internal stress in the amorphous magnetic alloy 11 varies in correspondance with the displacement of the tension transmitting shaft 15. Since the amorphous magnetic alloy has a magnetostrictive effect, the variation in stress is transformed into a variation in inductance. In this way, the tension in the tape 16 is sensed after being transformed.

Figure 2:
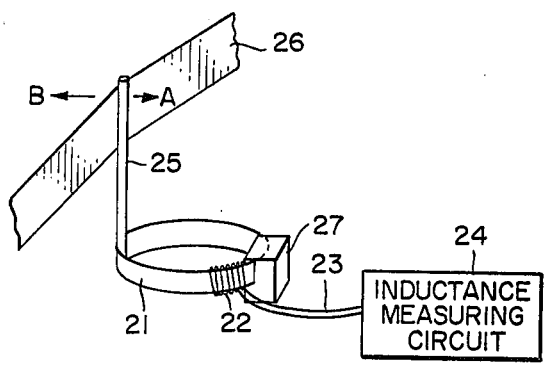
FIGS. 2, 3 and 4 are perspective views showing other tension sensors embodying this invention.

FIG. 2 shows the 2nd embodiment of this invention, wherein the numeral 21 indicates a thin belt-like amorphous magnetic alloy having a magnetostrictive effect and sufficient springy resiliency, configured into a ring, and retained so as to be fixed at one end thereof by the retainer 27. The numeral 22 indicates a coil wound around the magnetic core made of the amorphous magnetic alloy 21 so as not to hamper the motion of said alloy 21. The numeral 23 indicates a lead wire connected to a inductance measuring circuit 24.

When the retainer 27 is positioned so that the tension transmitting shaft 25 is brought into contact with the tape 26 having a certain degree of tension therein, the tension transmitting shaft 25 tends to be displaced by thrust of the tape 26 in the direction shown by the arrow A; however, another force to thrust said shaft backward in the direction shown by the arrow B on account of springy resiliency of the amorphous magnetic alloy 21 also acts. Therefore, displacement of the tension transmitting shaft is stopped when the two forces are in equilibrium. At this time, the internal stress in the amorphous magnetic alloy 21 varies in correspondence with the displacement of the tension transmitting shaft 25 and is sensed as a variation in inductance due to the magnetostrictive effect.

Parts other than those to which tension in the amorphous magnetic alloy 21 is transmitted may be constructed to compose a magnetic circuit having other magnetic substances in place of the amorphous magnetic alloy.

In the above-described two embodiments, an appropriate selection of the length of tension transmitting shaft makes it possible to respond to variety in the degree of tension to be measured. The use of material which is excellent in its wear-resistance for the tension transmitting shaft ensures the long life thereof.

Figure 3:
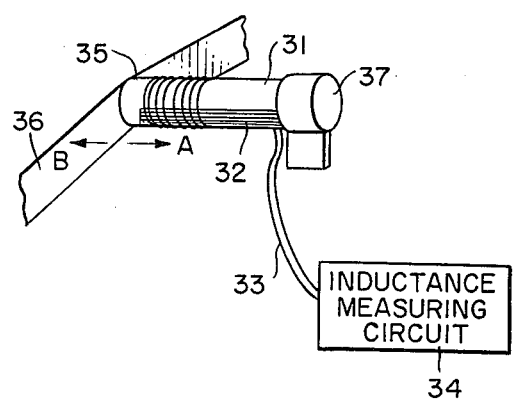

FIG. 3 shows the 3rd embodiment of this invention, wherein the numeral 31 indicates a thin belt-like amorphous magnetic alloy having magnetostrictive effect, wound in the form of sprial, and having one end thereof retained to be fixed to the retainer 37. To the other end, a tension transmitter 35 made of highly wear-resistant material is fixed. The numeral 32 respresents a coil which is wound around the magnetic core of the amorphous magnetic alloy 31 so as not to hamper the motion of the amorphous magnetic core 31. The numeral 33 stands for a lead wire connected to a inductance measuring circuit 34.

When the tape 36 has a certain degree of tension therein and the retainer 37 is positioned so that the tip of the tension transmitter 35 is brought into contact with the tape, the amorphous magnetic alloy is deformed by the force applied thereto and the tension transmitter 35 tends to be displaced in the direction shown by the arrow. A in the drawing; however, at this time another force tending to thrust the transmitter backward in the direction shown by the arrow B also acts. Eventually, the displacement is stopped when the two forces are in equilibrium. At this time, the internal stress in the amorphous magnetic alloy varies in correspondence with the displacement of the tape contacting part. Since the amorphous magnetic alloy has a magnetostrictive effect, variations in stress can be output as variations in inductance.

In this embodiment, too, an appropriate selection of the tape contacting part of high quality makes it possible to obtain a highly wear-resistant tension transmitter. Also, since even a small number of constituent parts satisfy the purpose, there is an advantage in that the device can be compactly fabricated.

Figure 4:
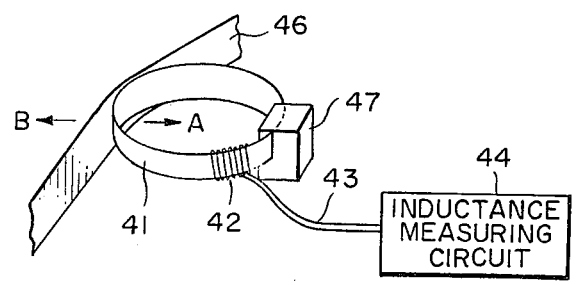

FIG. 4 shows the 4th embodiment of this invention. As shown in the drawing, a ring-shaped amorphous magnetic alloy 41 having magnetrostrictive effect is put into direct contact with the tape 46. In the drawing, the numeral 42 indicates a coil wound around a magnet core of the amorphous magnetic alloy 41 so as not to hamper the motion of the amorphous magnet core 41. The numeral 43 indicates a lead wire connected to the inductance measuring circuit 44. The numeral 47 represents a retainer for fixedly retaining the amorphous magnet alloy 41.

When the tape 46 has a certain degree of tension therein and the retainer 47 is positioned so that the amorphous magnet alloy 41 is brought into contact with the tape 46, said alloy 41 tends to be deformed and, on the other hand, the springy resiliency thereof tends to thrust the tape 46 backward. Deformation stos when the two forces are in equilibrium. As a result, the internal stress which is generated within the amorphous magnet alloy 41, responds to the deformation of said alloy 41. Since the amorphous magnetic alloy has a magnetrostrictive effect as described earlier, variations in stress can be taken out as variations in inductance.

In this embodiment, too, there is an advantage in that a small number of constituent parts satisfy the purpose and a tension sensor can be fabricated compactly in the same way as in the 3rd embodiment.

In the above four embodiments, the structure is designed to utilize the springy resiliency of the amorphous magnetic alloy, thereby requiring only a small number of constituent parts which leads to the simplicity thereof. Amorphous magnetic alloy is suitable for mass-production, and is inexpensive and readily available, and provides advantage in the production of a tension sensor at a low cost. Furthermore, excellent magnetic and mechanical properties of the amorphous magnetic alloy can be utilized, enabling the materialization of a high output device which can withstand an excessive input, and has a low degree of temperature-dependency and a high reliability.

Figure 5:
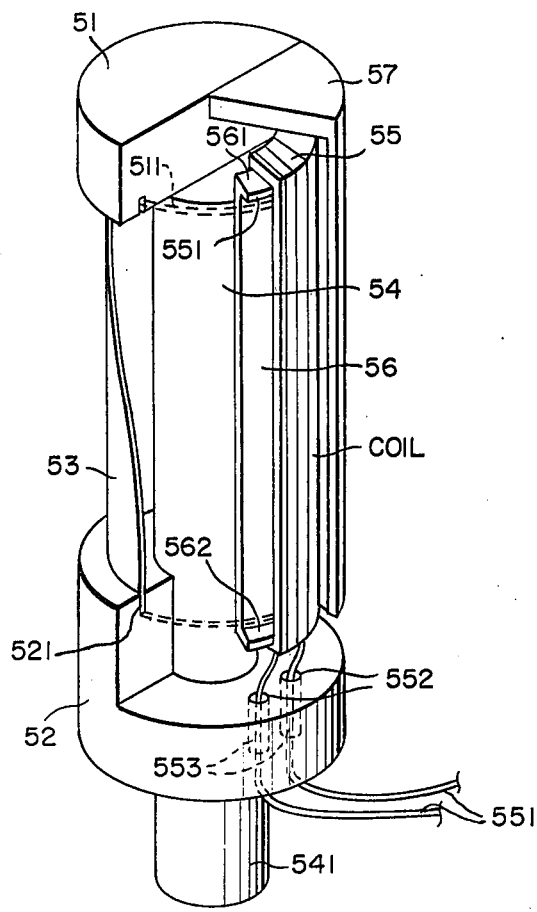
FIG. 5 is a perspective view of still another tension sensor embodying this invention, including a partial sectional view thereof at one end.

FIG. 5 shows the 5th embodiment of this invention as a modification of that shown in FIG. 4. The numerals 51 and 52 indicate supporting parts provided with grooves 511 and 521, respectively, for fixing the amorphous magnetic alloy 53. The upper supporting part 51 is fixed to the center column 54 and made in the form of a column having a semi-circular bottom surface and a groove 511 engraved semi-circularly as well. The lower supporting part 52 is also fixed to the center column 54, and the semi-circular part thereof corresponding to the upper supporting part 51 is made taller in configuration than the other part, the groove 521 being engraved on this semi-circular part so as to correspond to the groove 511. The amorphous magnetic alloy 53, after cut into a piece of appropriate size, is adapted so as to be bent like the cylindrical surface by appropriate heat treatment so as to fit into the abovesaid grooves 511 and 521, and finally fixed to these grooves by adhesion. An exciting coil 55 is wound around the bobbin 56 in the vertical direction. The bobbin is made up so as to be provided with langes 561 and 562 to define a gap through which the amorphous magnetic alloy 53 passes. Terminals of the coil are passed through the terminal-fixing holes 552 and fixed by element 553 so that no external force is exerted upon the amorphous magnetic alloy 53 through the coil bobbin. The coil part is protected from external influence by the upper cover 57 fixed to the upper supporting part 51. These are supported and fixed by an extended part 541 of the center column 54.

Figure 6:
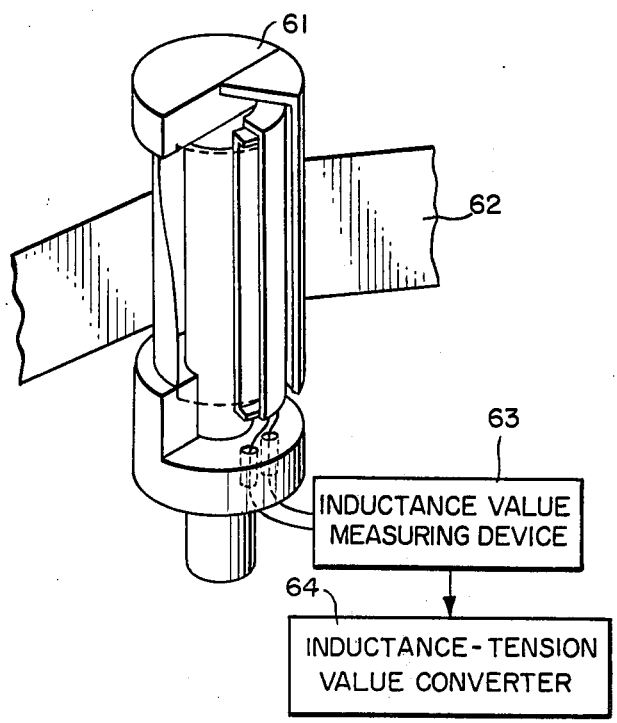
FIG. 6 is a view showing the configuration of the tension sensor shown in FIG. 5 while it is being used for tension sensing.

FIG. 6 shows the state in which the embodiment shown in FIG. 5 is put into practical operation, wherein stress is being applied to the tension sensor 61 of the embodiment shown in FIG. 5 by the tape-shaped object to be measured. Then, the inductance value of the tension sensor 61 varies and is measured as a tension value by the inductance value measuring device 63 and the inductance-tension value converter 64.

In this embodiment, since the amorphous magnetic alloy is made up into a cylindrical form by heat treatment so as to be fit into the upper and the lower grooves, tight fixing of the amorphous magnetic alloy is made possible without applying useless stress thereto. Consequently, the amorphous magnetic alloy having a high magnetostrictive effect can be set under the state of almost no initial stress and, therefore, a highly sensitive tension sensor in which its inductance value varies over a wide range is obtained. This eensor is characterized by a small displacement thereof and less disturbance to the object to be measured. Furthermore, the use of the amorphous magnetic alloy which is rich in its springy resiliency enables the insertion of said alloy 53 into the gap between the coil 55 and the bobbin 56 after winding the coil 55 around the bobbin 56, which eliminates the need for toroidal winding, facilitates cost saving, reduces the number of constituent parts as a whole, improves the quantity and decreases the cost of materials, simplifies the process, and can provide inexpensive sensors. In a fashion which is similar to each of the embodiments shown in FIGS. 1 through 4, excellent magnetic and mechanical properties of the amorphous magnetic alloy bring into existence a tension sensor which is durable with respect to excessive inputs, and is highly reliable, and has a low temperature-dependency.

Figure 7:
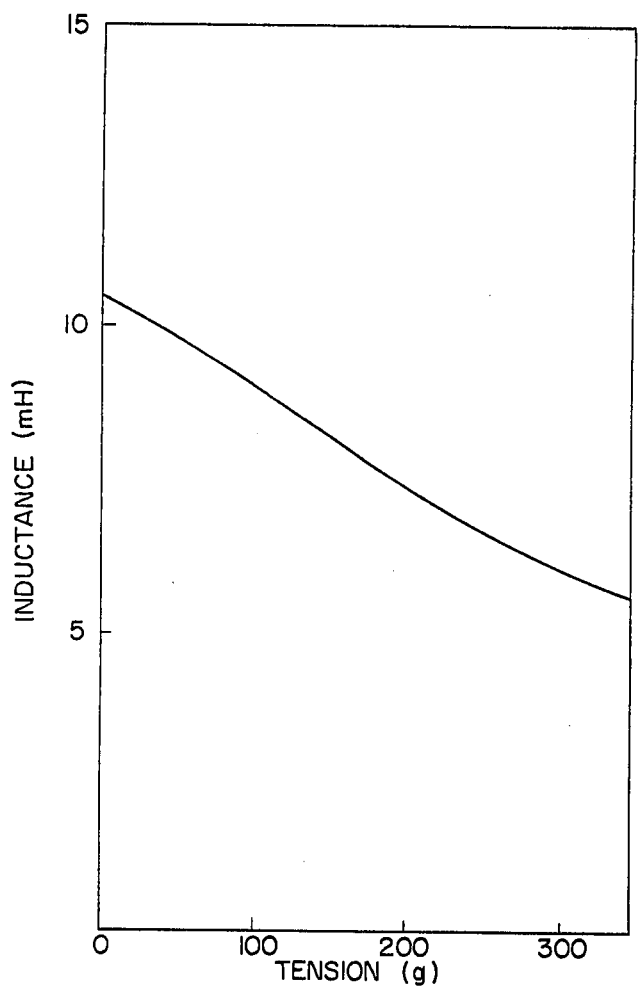
FIG. 7 is a diagram showing the relationship between the tension in the tape-shaped object to be measured and the inductance.

FIG. 7 shows the relationship between the tape tension and inductance when the tension sensor in such structure as shown in FIG. 6 is used under the conditions shown in Table 2.

From FIG. 7, it is understood that since inductance decreases in proportion to variations in the tape tension and at large variation rates, the tape tension can be measured at high precision and high sensitivity.

TABLE 2

| | |
|---|---|
| Winding angle of tape | 90° |
| Material of amorphous sheet | $(Fe\ 0.95\ Cr\ 0.05)_{79}Si_{12.5}B_{8.5}$ |
| Thickness of amorphous sheet | 40 μm |
| Height of amorphous sheet | 20 mm |
| Dia. of wound amorphous sheet | 4.8 mm |
| Number of turns of exciting coil | 200 |
| Dia. of exciting coil | 40 μm |
| Power source | Voltage (5 V) |
| | Current (2 mA) |
| | Frequency (20 KHz) |

Figure 8:
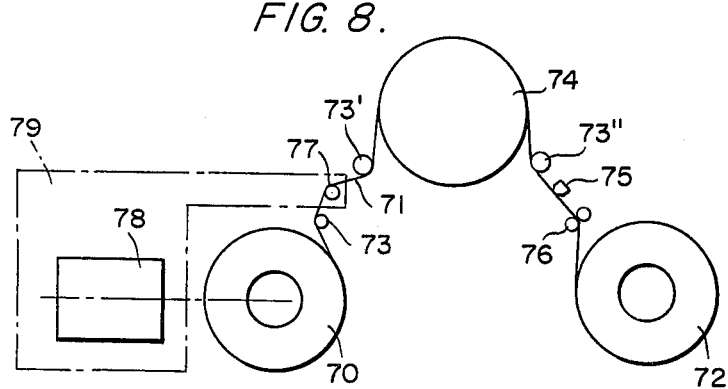
FIG. 8 is a diagrammatical view showing the structure of a tension sensor according to this invention when used for controlling tension in the tape of a VTR; and, FIG. 9 is a view showing an example of a tape tension control circuit to be used for the structure shown in FIG. 8.
Figure 9:
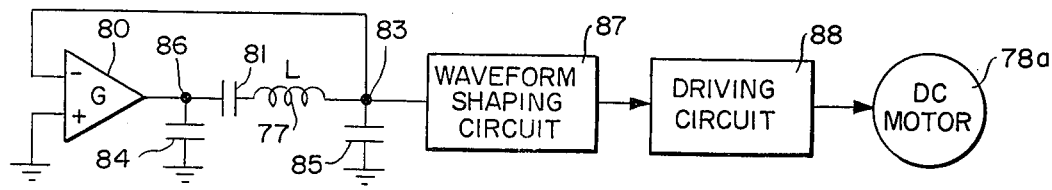

FIG. 8 shows a case in which a tension sensor according to this invention is used for controlling the tape tension in VTR. In FIG. 8, the numerals 70 and 72 respectively indicate the feed reel for feeding the magnetic tape 71 and the take-up reel for winding up said tape 71. The magnetic tape fed from the feed reel 70 is wound about 180° around the guide drum 74 incorporating the rotating magnetic head (not shown) via guide posts 73 and 73', and is then wound around the take-up reel 72 via guide post 73", audio-control head 75, etc. The numeral 76 indicates a capstan for drawing out the magnetic tape from the feed reel 70 and adapting the tape to run. The numeral 77 represents a tension sensor according to this invention and is disposed to be in contact with the magnetic tape 71. The numeral 78 stands for a motor for imparting tension to the magnetic tape and is driven so as to rotate the feed reel in the direction to wind up the magnetic tape. The capstan 77 draws out the magnetic tape from the feed reel in opposition to the rotating force of the motor 78. A block 79 shown by the alternate long and short dashed line is a control circuit for controlling tension in the magnet tape, an embodiment thereof being shown in FIG. 9. In this drawing, a differential amplifier 80 is connected to the terminal 83 through a capacitor 81 and the tension sensor 77 (indicated in FIG. 9 as L and representing reactance) according to this invention. One end of a capacitor 84 is connected to the terminal 86 and the other end thereof is connected to the ground. One end of a capacitor 85 is connected to terminal 83 and the other end thereof is connected to round. The terminal 83 is connected to the differential amplifier 81; the capacitors 84 and 85, and the tension sensor 77 along with the amplifier 81 arranged in such manner as to form an oscillator circuit. The oscillation frequency generated by this circuit varies in correspondence with the inductance variation caused by the tape tension applied to the tension sensor 77. The numeral 87 indicates a waveform shaping circuit to transform the sinusoidal wave generated by the oscillator circuit into pulses. The numeral 88 indicates a driving circuit for driving the DC motor which imparts a rotating force in the direction of winding up the magnetic tape to the feed reel 70, inputting a DC voltage to the motor 78a corresponding to the frequency of the output from the waveform shaping curcuit 87. In the abovenoted structure, for example, when the tension in the magnetic tape to be sensed by the tension sensor 77 decreases, the inductance of the tension sensor decreases and, therefore, the oscillation frequency of the oscillator circuit increases. Consequently, the driving power of the DC motor 78a increases and the magnetic tape is subjected to control so that tension therein is increased. When tension in the magnetic tape is increased, the inductance in the tension sensor 77 is conversely decreased and the oscillation frequency in the oscillator circuit decreases, whereby the driving power of the DC motor as well as the tension in the magnetic tape is weakened. In this way, the tension in the magnetic tape is controlled so as to be constant all the time.

In the above example, a description was made in a case that the tension sensor according to this invention is used for controlling the tension in the magnetic tape so as to be constant; however, in other cases, such as the occurrence of an abnormal tension in the magnetic tape for some reasons, the tension sensor according to this invention is also available for sensing such abnormal tension as above, adapting the capstan to stop the running of the magnetic tape and preventing damage to the magnetic tape.

Although five embodiments of this invention have so far been described, advantages of these embodiments are not lost as far as magnetostriction of the amorphous magnetic alloy is used even when a part of the amorphous magnetic alloy is replaced by other kinds of magnetic substances.

Similarly, it is apparent that a plating or other anticorrosion treatment on a part or the whole of amorphous magnetic alloy sheet reduces none of its advantage at all.

As described above, this invention is intended to utilize the magnetostrictive effect, which has been rather difficult to apply, by combining it with the excellent magnetic and mechanical properties of the amorphous magnetic alloy, demonstrate the possibility of materializing a tension sensor utilizing the magnetostrictive effect, and providing a tension sensor which is novel in structure as a means of embodying the above possibility.

What is claimed is:

1. A tension sensor for measuring the tension of a tape-like or string-like object and having a magnetic core composed of a resilient and magnetostrictive amorphous alloy sheet forming a magnetic circuit and having an exciting coil wound around said magnetic core, wherein:

said magnetic core is tubular shaped and supported by supporting means at both end portions thereof such that at least a part of said magnetic core is fixed to said support means; and said exciting coil is arranged such that magnetic flux generated therefrom is passed circumferentially through said magnetic core and a part of a peripheral surface of said magnetic core is exposed so that said tape-like or string-like object is in contact therewith.

2. A tension sensor as claimed in claim 1, further comprising a bobbin having flanges at both ends thereof around which said coil is wound so as to cross over said flanges, said magnetic core being mounted so as to pass through a slit formed by said bobbin and said coil.

3. A tension sensor as claimed in claim 1, wherein said supporting means comprises:

a center column positioned through an internal space of a tubular portion of said magnetic core; and upper and lower supporting parts fixed to said center column, said magnetic core being supported between said upper and lower parts.

4. A tension sensor as claimed in claim 3, wherein said upper and lower supporting parts have grooves facing each other and said end portions of said magnetic core are respectively set in said grooves.

* * * * *